March 10, 1936.  C. BORNMANN  2,033,225
PROJECTOR
Filed Jan. 21, 1932

INVENTOR.
CARL BORNMANN.
BY Philip S. Hopkins
ATTORNEY.

UNITED STATES PATENT OFFICE 2,033,225

PROJECTOR

Carl Bornmann, Binghamton, N. Y., assignor to Agfa Ansco Corporation, Binghamton, N. Y., a corporation of New York Application January 21, 1932, Serial No. 587,897

3 Claims. (Cl. 88—17)

My invention relates to a projector and particularly to an illuminating means for motion picture projectors during the threading operation thereof.

With the commercial advent and popularity of the small 16 m. m. projectors, many of these are now used in the homes and it is well known that it has become a source of some annoyance and difficulty to the amateur users of these projectors to properly thread the same. The parts are relatively small and it is sometimes difficult to properly thread the film around the feed sprocket of the projector. This difficulty is considerably increased if the threading operation is attempted in the dark or without adequate light on the projector. In the homes it has been necessary to turn on the regular lights of the room in order to thread the projector. This is often annoying and often detracts from the entertainment being provided.

In order that this difficulty may be overcome and in order that adequate illumination for the film sprocket of the projector may be had from the projector itself, I have provided a simple and novel means for at all times adequately illuminating the film sprocket of the projector.

Other objects and advantages in details of construction will be apparent as the description proceeds, reference now being had to the figures of the accompanying drawing forming a part of this application and wherein like reference numerals indicate like parts.

Figure 1:
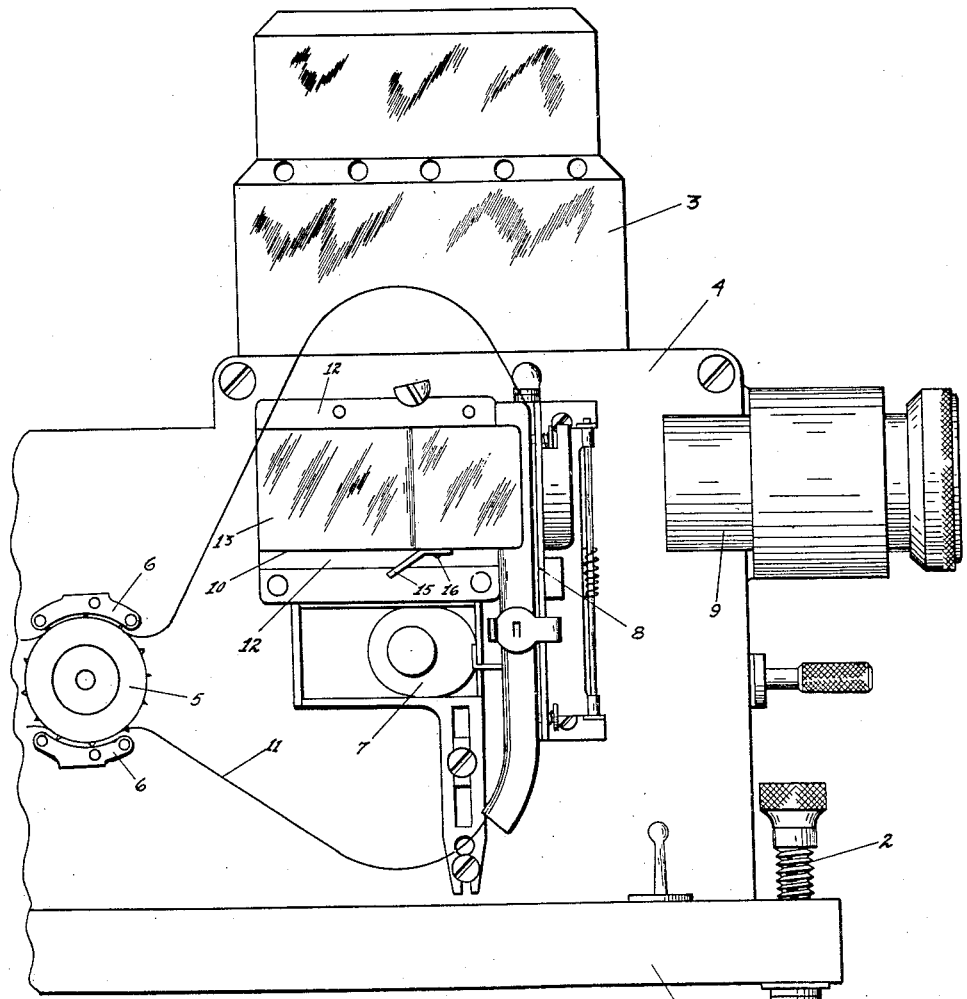
Figure 1 is a partial side view of a motion picture projector of the type above referred to and embodying my invention.

The reference character 1 indicates generally a supporting base for the projector. Adjusting screws 2 provide for the usual tilting of the projector for proper alignment on the screen.

3 indicates the lamp housing and 4 a partition casing upon which is mounted the film feeding sprocket 5 with its film holding shoes 6, the intermittent film moving mechanism 7, the film gate 8, the lens mount 9, and the reflector casing 10 by means of which the light from the lamp within the housing 3 is reflected at right angles through the film 11 in the film gate and on through the lens mount 9 for projection to the screen.

Figure 2:
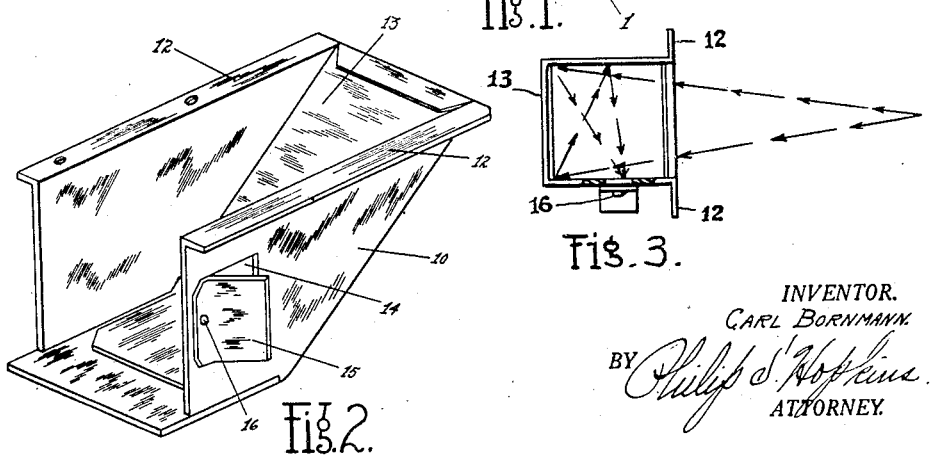
Figure 2 is a detail perspective view illustrating the reflector means employed in my invention.
Figure 3:
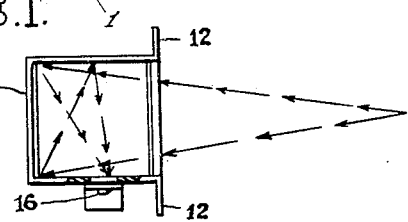
Figure 3 is a diagrammatic view illustrating the light paths.

The details of these various features and elements of the projector have not been illustrated nor will they be described as they form no part of this invention, with the exception of the reflector member 10 which, as shown clearly in Figure 2, is preferably a stamped casing provided with flanges 12 whereby the same may be secured to the partition casing 4. The angular side 13 of the reflector casing may be provided with any suitable reflecting surface such as a prism or mirror which is positioned in alignment with the light source from the housing 3 and so disposed as to reflect the light at right angles outwardly through the front of the reflector housing and through the film 11 in the film gate.

The bottom side of the reflector housing 10 is provided with a small opening 14 and secured to the bottom of the casing directly adjacent the opening 14 is a reflector piece 15 suitably secured as by means of the rivet 16. The position of this reflector 15 with respect to the opening 14 is such that a certain amount of the light passing through the casing 10, escapes through the opening 14 and is reflected by the reflector 15 rearwardly and downwardly and directly upon the film sprocket 5 whereby the same is always illuminated whenever the lamp in the housing 3 is turned on.

It will be obvious, of course, that if desired, the reflector 15 may be struck from and bent downwardly at one edge from the bottom of the casing 10 instead of being a separate piece as shown.

Thus I have provided a simple means whereby the film sprocket of motion picture projectors may be always illuminated from the projector light itself, thus adding greatly to the convenience of threading the film for projection.

Of course, changes may be made in details of construction and arrangement of parts without departing from the spirit and scope of my invention. I do not limit myself, therefore, to the exact form herein shown and described other than by the appended claims.

I claim:

1. In combination with a motion picture projector having a film sprocket and an enclosed projection light reflecting means for film illumination at a point spaced from said sprocket, and means for diverting a portion of the light rays angularly from said passage to said sprocket.

2. In combination with a motion picture projector having a film sprocket and an enclosed projection light reflecting means for film illumination at a point spaced from said sprocket, a housing for said reflecting means, and means on said housing for directing a portion of said light angularly to said sprocket.

3. In combination with a motion picture projector having a film sprocket and a projection light reflecting means for film illumination at a point spaced from said sprocket, a housing for said reflecting means, said housing having an opening in one side thereof through which a portion of the light may pass, and a reflector on said housing adjacent said opening for directing said portion of light angularly to said sprocket.

CARL BORNMANN.